March 31, 1936. H. S. HUMPHREYS Re. 19,906

ORNAMENTAL HARD SURFACE COVERING

Original Filed June 30, 1931

INVENTOR

Harry S. Humphreys by his attorneys

Byrnes, Stebbins, Parmelee & Blenko

Reissued Mar. 31, 1936

Re. 19,906

UNITED STATES PATENT OFFICE 19,906

ORNAMENTAL HARD SURFACE COVERING

Harry S. Humphreys, Lancaster, Pa., assignor to Armstrong Cork Company, Lancaster, Pa., a corporation of Pennsylvania Original No. 1,929,277, dated October 3, 1933, Serial No. 547,875, June 30, 1931. Application for reissue September 25, 1935, Serial No. 42,165

20 Claims. (Cl. 41—17)

Figure 1:
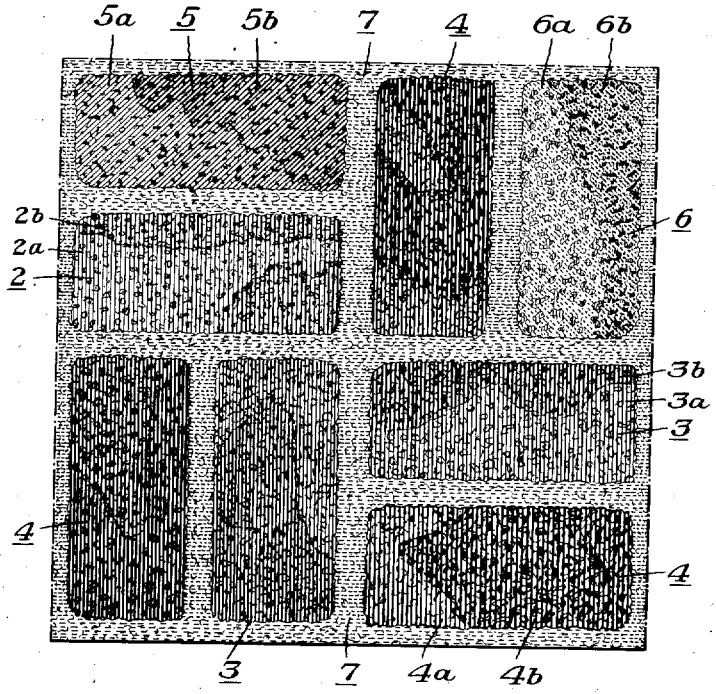

This invention relates to an improved ornamental hard surface covering and particularly a linoleum of the molded inlaid type.

It is desirable from a design standpoint to form pattern elements in molded inlaid linoleum which are shaded in character. For example, in a tile pattern it is desirable to represent variations in tone somewhat analogous to the variations normally occurring in burned ceramic tile. In various other types of patterns it is equally desirable in obtaining shaded effects. Unfortunately it has not been heretofore possible to obtain a desirable shading in linoleum of this character. In the manufacture of linoleum by the molded inlaid process the linoleum mix in granular form is supplied through stencils to a backing and the pattern thus made is consolidated under pressure. Each color supplied through the stencils is necessarily uniform in character. So-called "granite" linoleum has been made by mixing particles of two or more colors together, but here, as in monotone patterns, the effect obtained is one which is uniform over the surface considered as a whole, there being no shading from one part of a design element to another.

Because of the limitation above stated, the shadings heretofore attempted have been relatively harsh in character and the line of demarcation between adjacent portions intended to shade off from one another has been well marked. The problem is aggravated by the fact that the materials will inevitably vary in color from time to time, due to variations in the ingredients or because of the compounding. In consequence, any shading which might be obtained at one time by careful selection of colors would be destroyed at other times due to color variations. Large-scale production is not feasible in such circumstances. By reason of the interlocking of granules along the line of juncture, such line is wavy or palsied in character, and of itself detracts from the appearance of the goods.

By the present invention, highly desirable shaded effects are obtained, and this despite the inevitable color variations which occur in commercial production. I provide pattern elements (preferably bounded by interliners) which are made up of contiguous patches executed in a plurality of colors, these colors being related to one another in accordance with novel principles set forth in detail below. The several colors in any given patch are made up separately and the granules of color are mixed together so as to form a multi-color patch. The patches are each made up of visually distinguishable granules, and the invention involves the use of colors, common to the several patches, in such manner that the desired shading effect will be obtained with certainty. Care should be taken, as hereinafter described, in selecting the colors to be used, but where a proper selection is made and the several colors are present in the proper amount, highly desirable effects are obtained. On close examination each patch appears mottled. The contiguous patches are preferably joined on a line which is irregularly directed, and this irregular direction, coupled with the wavy character of the line occasioned by the interlocking of adjacent granules, gives the visual effect of one part of the decorative element merging softly and imperceptibly into another portion thereof. It is thus possible to obtain shaded effects not heretofore available to the designer.

As stated, care should be employed in the selection of the colors of the several patches. I prefer to employ colors which, when graded according to the Munsell system, do not vary from one another by more than certain definite amounts as hereinafter set forth.

The ratio of area occupied by the different colors in a patch is, as stated, important if the desired effect is to be obtained. The two colors present in any patch should be combined in such ratio that proper contrast is obtained. If there is too little of one color there will be no apparent contrast and no marked shading in the decorative element. If, on the contrary, the color which is common to the several patches is not present in a sufficient amount there will be too much contrast between the other colors and the effect will again be lost.

Figure 2:
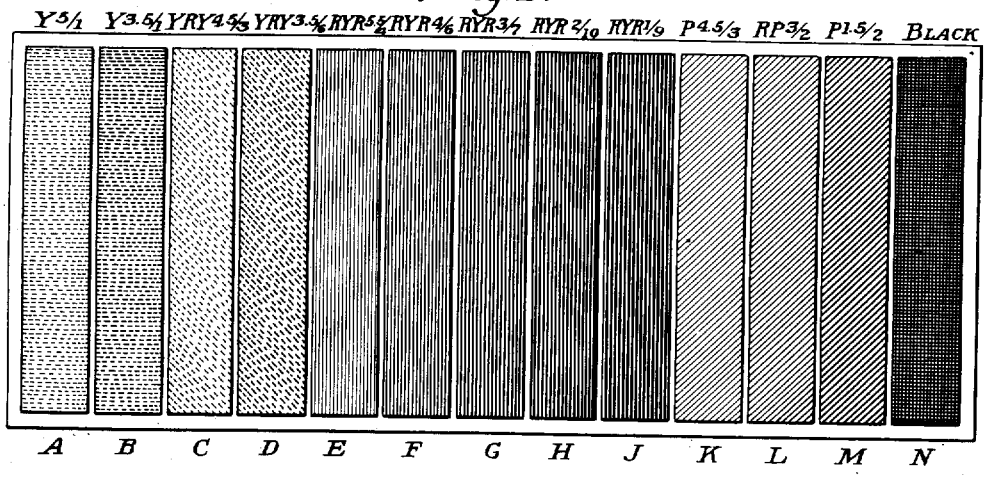

In the accompanying drawing illustrating a present preferred embodiment of the invention as applied to a tile pattern, Figure 1 is a top plan view of a piece of my improved material, and Figure 2 is a color chart showing the colors employed.

The design of Figure 1 is a representation of a tile pattern embodying tile elements 2, 3 and 4 in different shades of red, a purplish tile 5 and a brownish tile 6, the several tiles being shown with a mottled interliner 7 of a neutral color. The interliner is of great value in improving and contributing to the desired shaded effect, as is set forth in greater detail below. The several tile elements are made up of mottled patches, 2*a*, 2*b*, 3*a*, 3*b*, etc. In the drawing the line of demarcation between contiguous patches is rather sharply shown for purposes of illustration, but it will be understood that in the material itself such sharpness of definition is not desired, and if the colors are properly employed will not be so apparent.

The line of juncture between patches is, as stated, irregularly directed, and, in addition, is wavy in character. The waviness is occasioned by the interlocking of the particles making up the mix. Each patch is made from a mixture of colors, which gives a mottled effect. On close examination of the pattern individual surface granules may be detected, but as ordinarily viewed there is a soft blending of color at the line of juncture and a desirable shading of the decorative element.

The practice of my invention requires the use of colors common to contiguous patches in the several shaded pattern elements. It will be understood that where I refer to a "common color" in contiguous patches I mean to include those cases where there is sufficient identity and quantity of color in each patch that the effect is obtained even though there may be a slight difference observable in the colors if viewed independently.

I may, as hereinafter more fully described, employ two common colors as this ensures the desired effect despite unintentional color variations. I may, for example, employ two colors of the same hue but of slightly different value, adding a proper amount of another color to this mixture for one patch and a proper amount of a fourth color to the mixture of a contiguous patch.

The effect on the eye of the small dots of color, particularly when viewed from the eye-height of an ordinary observer, is somewhat analogous to that obtained by viewing a half-tone. The effect on the eye is that of substantial continuity of color, although the color itself is present in discrete dots, which dots by reason of my invention are so disposed that the effect of shading is obtained, although uniform mixes for the several patches are employed. It is thereby possible to secure with certainty and with the possibility of accurate duplication desirable shaded effects.

I have made reference to the Munsell system of color and find that it is valuable in determining the mixes to be employed. According to the Munsell system (Munsell Book of Color, The Munsell Color Company, Baltimore, Maryland, 1929) all colors are considered from the standpoint of hue, value and chroma. The five principal hues, red, yellow, green, blue and purple, are designated by the initial letters R, Y, G, B and P. The five intermediate hues, yellow-red, green-yellow, blue-green, purple-blue and red-purple are correspondingly designated YR, GY, BG, PB and RP. The second intermediate hues are likewise designated by the initial letters. For example, the hue intermediate red and yellow-red is designated RYR.

The value or variable light strength in a color is designated by number. Pure black is numbered 0/ and pure white is numbered 10/. In point of fact, very few blacks go below 1/ and the usual white is rarely above 9/. The value of any color is an indication of how light or dark it is, and the value is determined by a comparison with the different grays of the value scale between 0/ and 10/.

The chroma of any color is a measure of its strength or intensity. There may be two colors of the same hue and value, yet one of them will be strong and the other weak and grayish. The chroma is a measure of change in a hue between neutral gray and the maximum chroma of such hue. Chroma is designated by a numeral placed below a line; for example, /5. Thus, any color may be completely and scientifically defined by designating its hue, value and chroma. In Figure 2, I have shown the several colors employed in the design, which colors have been given their designations according to the Munsell system. The interliners are, as stated, mottled, and the colors Y5/1 and Y3.5/1 are used. These colors are shown at A and B in Figure 2.

The tile 2 is a light red. A mix of reddish shades, indicated at F and G in Figure 2, is made up, equal amounts of the two colors being used. The color F is designated as RYR4/6 and the color G is designated as RYR3/7. In order to make the light patch 2a there is added a suitable amount of a color E, designated as RYR5.5/4. The darker patch 2b is made by adding to the mixture of colors F and G a suitable amount of a color H, designated as RYR2/10. In making the tiles 3, which are an intermediate red, the parent mix consists of the colors G and H. The lighter patch 3a of the tile 3 is made by adding to this mix some of the color F, and the darker patch is made by adding an amount of a color J, whose designation is RYR1/9. The darkest red tiles 4 are made by compounding a mix of the colors H and J, then adding to it an amount of the color G to form the lighter patch 4a and some of a color N (black) to form the darker patch 4b.

The purplish tiles 5 are made from the colors K, L, M and N. The colors K, L and M have the following designation: P4.5/3, RP3/2, P1.5/2. The parent mix is made by compounding the colors L and M to a part of which the color K is added so as to produce the light patch 5a, and to another part of which the color N is added to produce the dark patch 5b.

The brownish tiles 6 are made using as a parent mix a combination of colors C and D, whose designations are YRY4.5/3 and YRY3.5/6. To make the light patch 6a a desired amount of the color E is added to this mixture, and to make the darker patch 6b a desired amount of the color H is added.

It will be seen from a comparison of the values of the colors employed that in any given patch the difference in value of colors as measured on the Munsell scale is in no case more than 3/, and in most cases is not more than 2/. Considering the several design elements in their entirety, it will be seen that the difference in value between the lightest and the darkest colors present is not more than 3.5/ in any case. I prefer to hold the difference to less than about 3/. The chroma of the different colors may vary more widely, but should be taken into consideration, especially in the lighter colors. I prefer that in the lighter elements the difference in chroma shall not be over /4 in any patch.

The interliners greatly enhance the shaded effect, because they set each pattern element apart from adjacent pattern elements. This is of particular value in tile patterns, and also in patterns (whether of tile configuration or not) containing elements which are of generally the same hue but of different value or chroma. This is well illustrated by the specific embodiment above described, wherein the tiles 2 are composed of the colors EFGH, the tiles 3 of colors FGHJ and the tiles 4 of colors GHJN. If these tiles were not separated by the neutral interliners the presence, in contiguous tiles, of patches of the same composition would be confusing and lessen or destroy the desired effect.

As will be seen from the drawing, the several colors are present in the patches in the form of discrete visually distinguishable dots. At the line of juncture between patches there is an interlocking of particles, and the juncture line is therefore wavy or shaky in character. Since a large amount of color in the two patches is the same, the interlocking of the particles of such color destroys any visual evidence of the juncture line at such point, at least from the eye-height of the observer. Some of the dark particles which make one patch darker and some of the light particles which make the contiguous patch lighter will also lie adjacent the juncture line. By reason of the waviness of the line, particularly where it is irregularly directed, there is no apparent sharp line of separation, the effect being of a soft and gradual toning off.

The visual effect will necessarily depend to some extent upon the size of the particles employed. The particles must be small enough so that they can intermingle freely at the line of juncture between contiguous patches in order that the different colors may blend into a harmonious unit. If the granules are too large the contrast between contiguous colors will be too sharp and the desired shading effect will be lost. On the other hand, if the particles are so small that the eye cannot distinguish individual particles, the patch will appear as a solid color and the line of juncture between adjacent patches will be hard. I have found that if the colors are ground to at least the fineness usually employed for the making of granite linoleum suitable effects will be obtained. The fineness of the grinding may be varied depending on the style of the pattern, the relative strength of the colors, and the size of the pattern elements. In the pattern disclosed in Figure 1 of the drawing the rectangular pattern elements are approximately ⅞ inch wide by 2 inches long. For this pattern I have used a mix wherein all the particles pass through a 6 mesh screen. If coarser particles are used the mottling is too coarse. If the mix is so fine that all of the particles pass through a 10 mesh screen, the mottling is not coarse enough. It is not essential that all of the particles be of the same size and, in fact, I do not in practice discard the fines where there is a reasonable percentage of coarser particles (within the sizes above suggested) in the mix. The ratio of the amount of color added to the amount of common color is also important. This ratio depends directly upon the difference in values of the colors. For example, in making the light red patches 2a, I find that if to the mixture of the colors F and G there is added the color E in the ratio of one part of color E to three parts of the mixture of F and G, too much contrast results. If, on the other hand, the ratio is 1 to 8, the contrast is too small to produce the desired shading effect. In the brownish patch 6, however, where the difference in value between the mixture of colors C and D and the added color E is greater than in the case of the colors used in the patch 2a, one part of the color E added to 8 parts of the common color will produce the desired result. The ratio of the color E to the mixture of colors C and D may be as small as 1 to 12 before the desired amount of contrast is lost. Therefore, while to some extent the ratio may be varied according to the desires of the designer, it should, generally speaking, be maintained between 1 to 3 and 1 to 12, and preferably between 1 to 4 and 1 to 9. Since the admixture of particles for any given patch will be uniform, the total area exposed of the several colors in the mixture will be in a ratio corresponding to the ratio of amount of colors present. For example, in the patch 2a where, let us say, the amount of color E added to the mixture of colors F and G is in the ratio of 1 to 5, the total area in the patch of particles of color E will bear to the total area of particles of colors F and G the same ratio, namely, 1 to 5.

While I have illustrated and described a present preferred embodiment of the invention, it will be understood that it is not thus limited but may be otherwise embodied or practiced within the scope of the following claims.

I claim:

1. An ornamental hard surface covering of the inlaid linoleum type having a homogeneous body and comprising a plurality of decorative elements made up of differently colored contiguous mottled patches blending into each other, the several patches being constituted of visually discernible granules, each patch having at least one color common to itself and a contiguous patch and one patch also containing a color slightly different therefrom, the granules of the common color and the added color being of such size as to cause to the eye apparent blending of the different colors at the zone of juncture between the patches, the several decorative elements being separated by interliners.

2. An ornamental hard surface covering of the inlaid linoleum type having a homogeneous body and comprising a plurality of decorative elements made up of differently colored contiguous mottled patches blending into each other, the several patches being constituted of visually discernible granules, each patch having at least one color common to itself and a contiguous patch and one patch also containing a color slightly different therefrom, the granules of the common color and the added color being of such size as to cause to the eye apparent blending of the different colors at the zone of juncture between the patches, the several decorative elements being separated by mottled interliners.

3. An ornamental hard surface covering of the inlaid linoleum type having a homogeneous body constituted of united granules and comprising a plurality of decorative elements in representation of ceramic tiles, the several elements being made up of differently colored contiguous patches blending into each other and having an irregularly directed line of juncture, each patch being executed in at least two visually discernible colors, there being a visually discernible color in one patch which is substantially the same as a color in the contiguous patch.

4. An ornamental hard surface covering of the inlaid linoleum type having a homogeneous body constituted of united granules and comprising a plurality of decorative elements in representation of ceramic tiles, the several elements being made up of differently colored contiguous patches blending into each other and having an irregularly directed line of juncture, each patch being executed in at least two visually discernible colors, there being a visually discernible color in one patch which is substantially the same as a color in the contiguous patch, and interliners separating the decorative tile elements one from another.

5. An ornamental hard surface covering of the inlaid linoleum type having a homogeneous body constituted of united granules and comprising a plurality of decorative elements all of the same general hue but of varying values, the decorative elements being made up of differently colored contiguous patches blending into each other and having irregularly directed lines of juncture, each patch being executed in at least two visually discernible colors, there being a visually discernible color in one patch which is substantially the same as a color in the contiguous patch of the same pattern element, and interliners separating the said pattern elements.

6. An ornamental hard surface covering of the inlaid linoleum type having a homogeneous body constituted of united granules and comprising a plurality of decorative elements all of the same general hue but of varying values, the decorative elements being made up of differently colored contiguous patches blending into each other and having irregularly directed lines of juncture, each patch being executed in at least two visually discernible colors, there being a visually discernible color in one patch which is substantially the same as a color in the contiguous patch of the same pattern element, and interliners separating the said pattern elements, the interliners being of a neutral color.

7. An ornamental hard surface covering of the inlaid linoleum type having a homogeneous body constituted of united granules and comprising a plurality of decorative elements in representation of ceramic tiles, the said elements covering a major portion of the area of the goods, there being different tile elements which are of the same general hue but which vary one from the other in value, said tile elements being made up of differently colored contiguous patches blending into each other and having an irregularly directed line of juncture, each patch being executed in at least two visually discernible colors, there being a visually discernible color in one patch which is substantially the same as a color in the contiguous patch of the same tile element, and interliners separating the tile elements one from another.

8. An ornamental hard surface covering of the inlaid linoleum type having a homogeneous body constituted of united granules and comprising a decorative element made up of differently colored contiguous patches, each executed in at least two colors, the patches presenting different visual appearances but blending into each other, there being two visually discernible colors in one patch which are substantially the same, respectively, as two colors in the contiguous patch.

9. An ornamental hard surface covering of the inlaid linoleum type comprising a decorative element made up of differently colored contiguous mottled patches each executed in at least two colors, the patches presenting different visual appearances but blending into each other, there being two colors in one patch which are substantially the same, respectively, as two colors in the contiguous patch, the colors in a patch being of generally the same hue but of different value, the several colors referred to being visually discernible.

10. An ornamental hard surface covering of the inlaid linoleum type comprising a decorative element made up of differently colored contiguous mottled patches each executed in at least two colors and the patches presenting different visual appearances but blending into each other, there being two colors in one patch which are substantially the same, respectively, as two colors in the contiguous patch, the colors in a patch being of generally the same hue but of different chroma, the several colors referred to being visually discernible.

11. An ornamental hard surface covering of the inlaid linoleum type comprising a decorative element made up of differently colored contiguous mottled patches each executed in at least two colors and the patches presenting different visual appearances but blending into each other, there being two colors in one patch which are substantially the same, respectively, as two colors in the contiguous patch, the colors in a patch being of generally the same hue but of different value, the difference in value being not more than about 3/ on the Munsell scale, the several colors referred to being visually discernible.

12. An ornamental hard surface covering of the inlaid linoleum type comprising a decorative element made up of differently colored contiguous mottled patches each executed in at least two colors and the patches presenting different visual appearances but blending into each other, there being two colors in one patch which are substantially the same, respectively, as two colors in the contiguous patch, the colors in a patch being of generally the same hue but of different value, the difference in value being not more than about 2/ on the Munsell scale, the several colors referred to being visually discernible.

13. An ornamental hard surface covering of the inlaid linoleum type comprising a decorative element made up of differently colored contiguous mottled patches each executed in at least two colors and the patches presenting different visual appearances but blending into each other, there being two colors in one patch which are substantially the same, respectively, as two colors in the contiguous patch, the colors in a patch being of generally the same hue but of different chroma, the difference in chroma being not more than about /4 on the Munsell scale, the several colors referred to being visually discernible.

14. An ornamental hard surface covering of the inlaid linoleum type comprising a decorative element made up of differently colored contiguous mottled patches presenting different visual effects but blending into each other, the decorative element having two patches collectively executed in a series of at least three graded colors, there being two colors in one patch which are substantially the same, respectively, as two colors in the contiguous patch, the several colors referred to being visually discernible.

15. An ornamental hard surface covering of the inlaid linoleum type comprising a decorative element made up of differently colored contiguous mottled patches presenting different visual effects but blending into each other, the pattern element having two patches collectively executed in a series of at least four graded colors, two colors in such series being present in each patch, the several colors referred to being visually discernible.

16. An ornamental hard surface covering of the inlaid linoleum type comprising a decorative element made up of differently colored contiguous mottled patches each executed in at least three colors and the patches presenting different visual appearances but blending into each other, there being two colors in one patch which are substantially the same, respectively, as two colors in the contiguous patch, such common colors, in the aggregate, extending over an area which is greater than the area of the other color or colors in a ratio of more than 3 to 1, the several colors referred to being visually discernible.

17. An ornamental hard surface covering of the inlaid linoleum type comprising a decorative element made up of differently colored contiguous mottled patches each executed in at least three colors and the patches presenting different visual appearances but blending into each other, there being two colors in one patch which are substantially the same, respectively, as two colors in the contiguous patch, such common colors, in the aggregate, extending over an area which is greater than the area of the other color or colors in a ratio between 4 to 1 and 9 to 1, the several colors referred to being visually discernible.

18. An ornamental hard surface covering of the inlaid linoleum type comprising a decorative element made up of differently colored contiguous mottled patches and the patches blending into each other, there being two colors in one patch which are substantially the same as colors in a contiguous patch, one patch containing in addition to these common colors a different color, the several colors referred to being visually discernible.

19. An ornamental hard surface covering of the inlaid linoleum type comprising a decorative element made up of differently colored contiguous mottled patches and the patches blending into each other, there being two colors in one patch which are substantially the same as colors in a contiguous patch, one patch containing in addition to these common colors a different color, and the other patch containing in addition to these common colors still another color, the several colors referred to being visually discernible.

20. An ornamental hard surface covering of the inlaid linoleum type comprising a decorative element made up of visually discernible granules forming differently colored contiguous mottled patches, the patches blending into each other, each patch containing a plurality of colors substantially the same as in the other patch and an added color different from the common colors and from the color added to the other patch, the granules of the common color and of the added colors being of such size as to cause a blending of the different colors at the zone of juncture between the patches, the several colors referred to being each visually discernible.

HARRY S. HUMPHREYS.